United States Patent
Malley et al.

(10) Patent No.: US 7,962,726 B2
(45) Date of Patent: Jun. 14, 2011

(54) RECYCLING LONG MULTI-OPERAND INSTRUCTIONS

(75) Inventors: Edward T. Malley, New Rochelle, NY (US); Khary J. Alexander, Poughkeepsie, NY (US); Fadi Y. Busaba, Poughkeepsie, NY (US); Vimal M. Kapadia, New York, NY (US); Jeffrey S. Plate, Poughkeepsie, NY (US); John G. Rell, Jr., Saugerties, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 12/051,215

(22) Filed: Mar. 19, 2008

(65) Prior Publication Data

US 2009/0240914 A1    Sep. 24, 2009

(51) Int. Cl.
*G06F 9/00* (2006.01)
*G06F 9/44* (2006.01)
(52) U.S. Cl. ........................................ 712/220; 712/219
(58) Field of Classification Search .................. 712/219, 712/220
See application file for complete search history.

(56) References Cited

U.S. PATENT DOCUMENTS

| | | | |
|---|---|---|---|
| 4,189,768 A * | 2/1980 | Liptay et al. ................. | 712/204 |
| 5,197,137 A | 3/1993 | Kumar et al. | |
| 6,047,370 A * | 4/2000 | Grochowski ................. | 712/219 |
| 6,385,715 B1 * | 5/2002 | Merchant et al. ............ | 712/219 |
| 2004/0139299 A1 | 7/2004 | Busaba et al. | |
| 2004/0230773 A1 | 11/2004 | Busaba et al. | |

OTHER PUBLICATIONS

"IBM® z/Architecture Principles of Operation", Publication No. SA22-7832-05, 6th Edition, Apr. 2007. 1,215 pages separated into 4 electronic attachments.

* cited by examiner

*Primary Examiner* — Chun-Kuan Lee
*Assistant Examiner* — Jesse R Moll
(74) *Attorney, Agent, or Firm* — Cantor Colburn LLP; John Campbell

(57) ABSTRACT

A pipelined microprocessor configured for long operand instructions is disclosed. The microprocessor includes a memory unit and a load-store unit. The load store unit is coupled to the memory unit and includes a data formatter receiving information from the memory unit and including an operand selector and a shift register portion. The microprocessor also includes an execution unit coupled to the load-store unit and receiving operand information there from. The execution unit includes output latches coupled to a storage location within the execution unit for storing output information from the execution unit.

11 Claims, 5 Drawing Sheets

RECYCLING LONG MULTI-OPERAND INSTRUCTIONS

BACKGROUND OF THE INVENTION

This invention relates to computers and computer systems, and particularly to the handling of multi-operand instructions during a cache miss within a processor.

In a typical microprocessor, there exists at least a load-store unit (LSU) that maintains a level 1 transition lookaside buffer (TLB) and a level 1 cache, and an execution unit (FXU) that executes general fixed-point instructions. Many times, in program execution, it is necessary to access the cache and send the desired operand data directly (sometimes called a bypass) from the LSU to the FXU without effecting performance. In some instances, this may be done as part of a register storage (RX) instruction execution, as two related hardware micro-op instructions (a load instruction and an execution instruction cracked from an "RX" instruction), or as a fixed point instruction that is dependent on a previous load instruction.

Many times, for cycle-time or pipeline design reason, the FXU will already be performing execution on given cache data before it can react to a cache or TLB miss indication from LSU. In this case, a usual data pipeline will nullify current and future execution and recycle back to the point in the execution at which the cache miss occurred, awaiting an indication from the LSU that data is again ready for processing. Such a delay and restart shall be referred to herein as a "pipeline recycle." Of course, other conditions may create the need for a pipeline recycle, LSU cache misses are just among the more common.

In a complex instruction set computer (CISC) architecture there may be instructions defined that require multiple operands and possibly output multiple results. These instructions either operate on one long operand and generate a potentially long result, or operate on 2 long operands and generate a potentially long result. "Long," as the term is used herein with respect to operands and results, means that the width of the operand is larger than the width of the execution space (i.e., the processing width) of the processing unit performing the execution. Instances having long operands or long results require multiple cycles of operand accesses or result output. These multiple cycles increase the number execution steps.

In a typical processor having a 64 bit wide dataflow, a storage-to-storage (SS) type instruction has a length that is greater than 8 bytes. In a processor design where these long instructions are not emulated by code (such as millicode), or not cracked into micro-operations, a "pipeline recycle" in the middle of the execution may require special handling, since the "recycled" operation will have to be redone, and operations after that point might have already started and also have to be nullified due to dependencies. One way to handle this is to crack long instructions into micro-operations. Another is to emulate the instruction through internal code. However, these solutions may decrease performance, or may not be possible for all long instructions.

Other processor designs can avoid pipeline recycle by either accessing all operands ahead of time and storing them in a buffer before execution, or the processor pipeline design can allow the FXU control and dataflow to "freeze" when data is not available due to, for example, a cache miss. However, these solutions may require additional memory slow down the frequency of operation, or add additional pipeline cycles to allow the LSU data not available signal to freeze all FXU controls.

As discussed, during the execution of any multicycle instruction that must access operands multiple times, it is possible to experience a cache miss at any access, or other pipeline error conditions. In a processor pipeline that execute long instructions fully in hardware, and uses the "pipeline recycle" mechanism, this forces the processor into a recycle window during which execution of the instruction is paused, and possibly backed up to the operations at the miss. After this window completes, the instruction re-executes from the cycle that has experienced the miss and then continues its processing.

In the case of instructions where a given cycle of execution is dependent on the results of a previous cycle of execution and that given cycle's operand(s), two problems occur. The first problem is that the result of the current operation will need the result of the previous successful operation which was only a temporary result. Even if the LSU can resend previous operand data, the execution unit may not be able to re-execute a previous operation since the operation itself may be dependent on a result from even earlier execution. Similarly, it is possible that the operand data to be delivered from the LSU is dependent on two different accesses. In some instances, one access may have been fine but the other may have been a miss.

It would be desirable/advantageous to be able to allow both the LSU and the FXU to capture acquired data and results before the recycle window begins, and reuse that same data after the recycle has completed.

SUMMARY OF THE INVENTION

Additional features and advantages are realized through the techniques of the present invention. Other embodiments and aspects of the invention are described in detail herein and are considered a part of the claimed invention. For a better understanding of the invention with advantages and features, refer to the description and to the drawings.

One embodiment of the present invention is directed to a pipelined microprocessor configured for long operand instructions. The microprocessor of this embodiment includes a memory unit and a load-store unit coupled to the memory unit. The load-store unit of this embodiment includes a data formatter that receives information from the memory unit and including an operand selector and a shift register portion. The microprocessor of this embodiment also includes an execution unit coupled to the load-store unit and receiving operand information there from, the execution unit including output latches coupled to a storage location within the execution unit for storing output information from the execution unit.

Another embodiment of the present invention is directed to a load-store unit for use in a pipelined microprocessor. The load-store unit of this embodiment includes a data formatter, the data formatter configured to fetch operands from an external memory unit and to provide the operands to a functional execution unit. The load store unit of this embodiment also includes a shift register portion configured to store a copy of the operands for at least one operational cycle after the operands have been fetched the external memory unit.

Another embodiment of the present invention is directed to a method of recovery from a cache miss comprising: receiving operand data from a plurality of cache accesses; storing the operand data from a first cache access in a third buffer; a first shifting including shifting the operand data from the first cache access to a second buffer and storing the operand data from a second cache access into the third buffer; a second shifting including shifting the operand data from the first cache access to a first buffer, shifting the operand data from the second cache access to the second buffer and storing the operand data from a third cache access into the third buffer;

determining that a cache miss has occurred; and providing the operand data stored in one of the first buffer, the second buffer or the third buffer to an output.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Aspects of the present invention may allow for a more elegant recovery from a cache miss or other error that may require a pipeline recycle. To this end, and in general, a data formatting operand buffer (formatter) in the LSU may be used to hold interim operand data as it is fetched from storage for multicycle instructions. Any data that is already fetched into the formatter that needs to be returned on the recycled cycle may be saved and represented after recovery from a cache miss or other error. For multicycle instructions with two operands from storage, a cache miss for one operand does not prevent the retention of data from the corresponding (pre) fetch for the other operand. However, this may only retain the data required by the execution unit on the cycle with the cache miss; another mechanism is used for saving data and results from prior cycles of data returns and executions.

To address saving data from prior cycles of data returns and executions, the FXU may, according to the present invention, save partially completed results in a temporary storage area. In some embodiments, this may be accomplished, in millicode capable processors, by utilizing a millicode register file (MRF). For non-millicode capable processors, the storage area may be pre-assigned general purpose register (GPR) space managed by the GPR allocation manager inside an out of order processor, or some special spill registers.

For ease of explanation, the following description is limited to the usage of the MRF's. Of course, one of ordinary skill in the art will readily realize that the description is not limited to MRF's and may also be implemented in GPR's. In general, when the execution unit becomes aware that a cache miss has occurred, the result data from the last cycle that completed prior to the reject is steered towards the MRF. The broadcast of the reject overrides the write address information being sent to the MRF and pulses a write-enable, capturing the data. When the recycle window completes, read address information being sent to the MRF is then overridden, and a read-enable is pulsed. This forced read of the last result injects the partial result back into the execution pipeline, and the FXU can continue executing normally.

To operate during pipeline recycling during long instructions, the LSU and the FXU work synchronously. The method of storing and re-reading of pre-read data and partial results during pipeline recycle according to the present invention may help to ensure correct results following a pipeline recycle.

Figure 1:
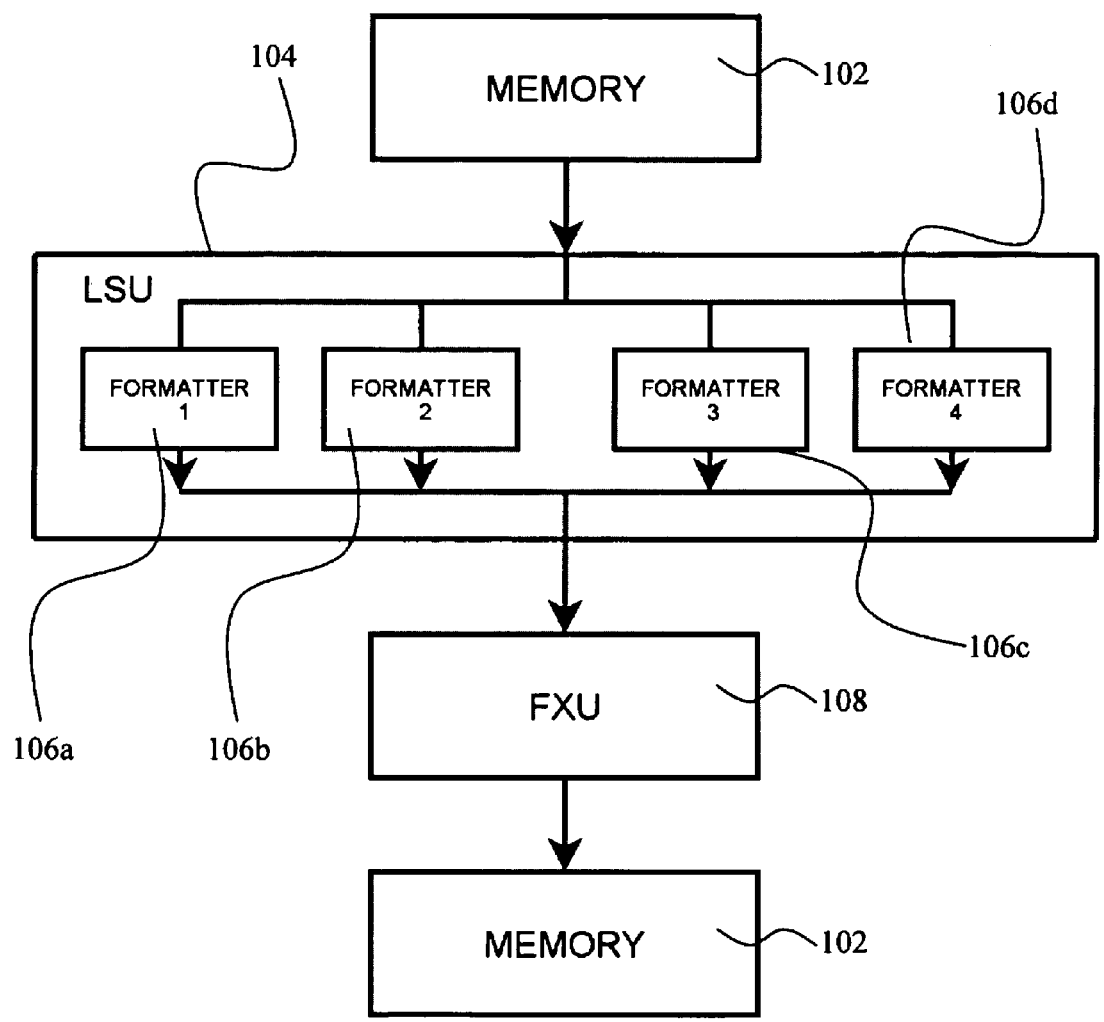
FIG. 1 shows an example of the interconnection and data flow according to an embodiment of the present invention.

FIG. 1 shows the interconnection and data flow according to an embodiment of the present invention. Of course, FIG. 1 only includes a portion of the elements of a typical computer system in which the present invention may operate.

Operand information is stored in a memory 102. This memory, of course, could be any type of memory including, for example, random access memory, read-only memory, flash memory or any other type of memory now known or later developed. The operand information is retrieved from memory by the LSU 104. As one of ordinary skill in the art will readily realize, memory retrievals by the LSU 104 from the memory 102 may be of any size. In some embodiments, each memory access may fetch 16 bytes. Of course, not all of the data needs to be returned in all cases. For example, in some cases only 8 bytes of data may be returned to the memory 102 after is has been operated upon. That is, for example, while 16 bytes may be read-in, the operations performed utilizing some or all of this information may only generate results that only require 8 bytes be updated or otherwise altered.

The LSU 104 may serve several purposes. First, the LSU 104 may retrieve operands for processes to be performed by the FXU 108. In addition, in the event that the memory access size is greater than the size of operands, the LSU 104 may select portions of the memory access to pass on to the FXU 108. In addition, and according to an embodiment of the present invention, the LSU 104 may also store copies of operands recently transmitted to the FXU 108. As discussed above, storing these operands may allow for more efficient and elegant recovery from a cache miss or other error which may require a pipeline recycle.

The LSU 104 may, in some embodiments, include one or more data formatters 106. As shown, the LSU 104 includes n data formatters, 106a, 106b, 106c, . . . 106n. For ease of explanation, it shall be assumed that the LSU 104 includes 4 separate data formatters. This is, however, by way of example only and only one data formatter may be included or any number greater than four may be included.

In the case where the LSU 104 includes four data formatters 106, it may be assumed that incoming operand information from memory 102 is divided equally among the data formatters 106. For instance, if a memory access retrieves 16 bytes, 4 bytes may be distributed to each data formatter.

Data selected by the data formatters 106 is passed to the FXU 108 for further processing. In addition, as data is passed to the FXU 108, each data formatter 106 according to an embodiment of the present invention may store a copy of the information. In some embodiments, the information may be stored for two or more cycles. In one embodiment, the information is stored for a number of cycles that is one greater than the number of cycles between when data is loaded from memory (or cache) until a memory (cache) access is discovered. In the description below, that number of cycles is assumed to be 3 (an EX-1 stage, an EX stage and a P1 stage), thus, mandating that the operand data be held for 4 cycles.

After data has been operated on by the FXU 108, the results of the operation may be returned to memory 102. According to embodiments of the present invention, the FXU 108 may store copies of the results for use in the event that pipeline recycle is required.

Figure 2:
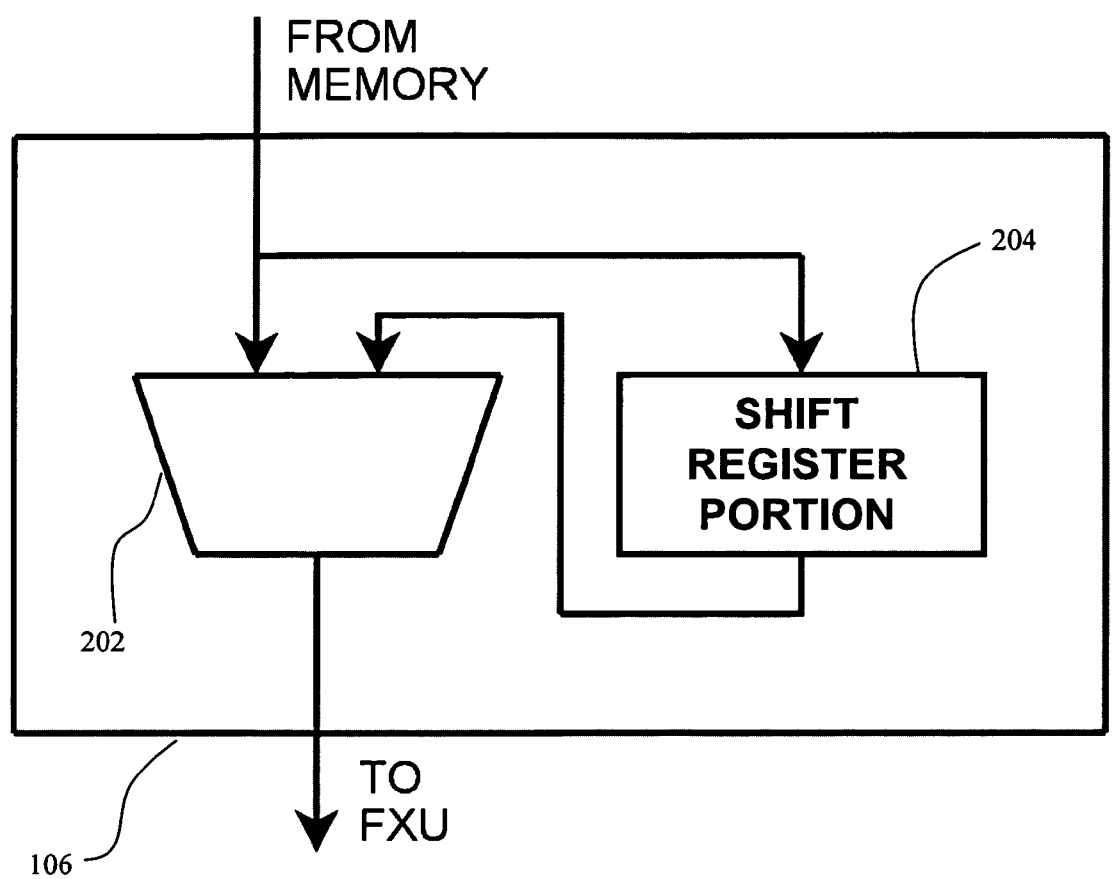
FIG. 2 shows a more detailed version of a data formatter according to the present invention.

FIG. 2 shows a more detailed version of a data formatter 106 according to the present invention. The data formatter 106 may include an operand selector 202 that selects some or all of the incoming data for transmission to an FXU. The data formatter may also include a shift register portion 204 that maintains a copy of a certain number of operands that were previously transmitted to the FXU. In the case of an error requiring a pipeline recycle, the operand selector may select data stored in the shift register portion 204 rather than data from memory. That is, the shift register portion 204 may allow the LSU to effectively "backup" a few steps, retransmit previously sent operand information, and then resume normal operation as a means of recovering from an error requiring a pipeline recycle. In short, storing previously transmitted operand data in the shift register portion 204 allows system to restart a multi-cycle instruction in the event of an error.

Figure 3:
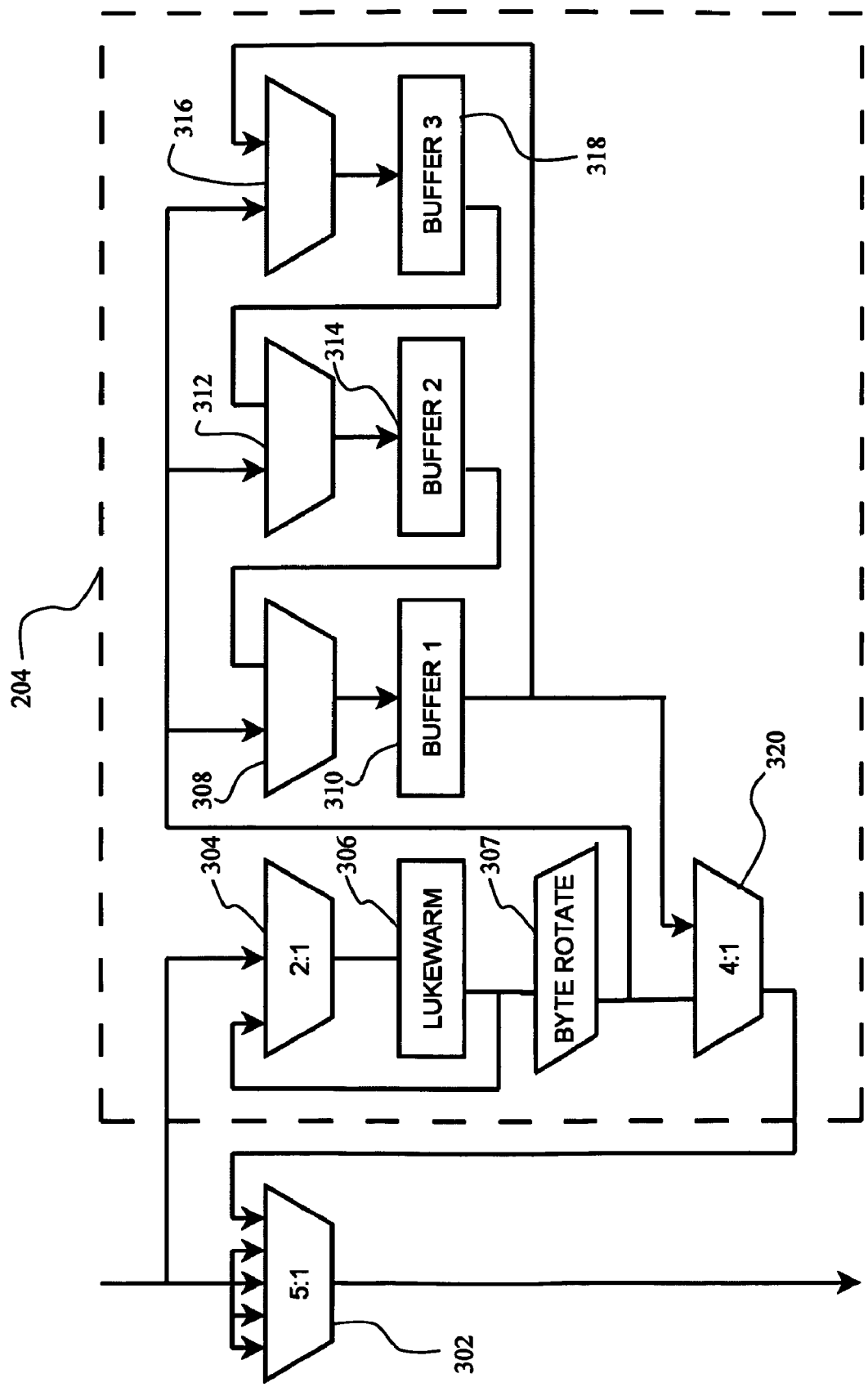
FIG. 3 shows a more detailed depiction of a data formatter shown in FIG. 2 according to an embodiment of the present invention

FIG. 3 shows a more detailed depiction of a data formatter 106 according to an embodiment of the present invention. The data formatter 106 includes an operand selector 302. In this embodiment, the operand selector 302 is implemented as a 5:1 multiplexer. This assumes that the data formatter 106 receives a four byte wide block of information from memory. In normal operation, the operand selector 302 selects one of the four bytes received from memory for transmission to an FXU each cycle. As discussed above, a particular LSU may have more that one data formatter 106 and, in such cases, each data formatter may be operating on a portion of the memory access and each producing an operand for transmission of the FXU.

The same four bytes are also presented to the shift register portion 204. In the event that a pipeline recycle is required, the operand selector 302 selects prior operand information that is received from the shift register portion 204.

The shift register portion 204, as discussed above, stores previously transmitted operand data for a number of cycles. The example shift register portion 204 shown in FIG. 3 includes 4 buffers, a lukewarm buffer 306, buffer 1 310, buffer 2 314, and buffer 3 318. These buffers may be configured to store the previous four operands that were transmitted to the FXU. In this manner, the example shift register portion may allow a system in which it is implemented to back up four steps in the event of a pipe line recycle. As discussed above, this may allow for a system that discovers a cache miss three cycles after a read to recover.

The same data that is received at the operand selector 302 may be presented to system delay element 304. The system delay element 304 may be implemented as a 2:1 multiplexer that selects one of two 4 byte wide inputs. In a first cycle after a memory access, the system delay element may select a prior value stored in the lukewarm buffer 306 to ensure prior data is not lost and to place the shift register portion 204 one cycle behind the operation of the operation of the system as a whole. The delay element 304 then selects information received from memory on successive cycles. This information is then stored in the lukewarm buffer 306. The shift register portion 204 may also include an optional byte rotation element 307. This byte rotation element is configured to shift bytes within the 4 bytes received from memory in accordance with the selection order performed by the operand selector 302 to ensure that stored data may be read out in the same order that it was originally transmitted in the event of a pipeline recycle.

Regardless, the remainder of the shift register portion is arranged to operate such that it shifts data from right to left. In particular, on every cycle of data return to the FXU, the existing data in buffers 1, 2 and 3 (310, 314 and 318, respectively) shifts to the left (the data from the lukewarm register 306 having initially been stored in buffer 3 318).

In more detail, the lukewarm buffer 306 is couple to the output of the system delay element 304. The output of the lukewarm buffer 306 is coupled to one of the inputs of the system delay element 304 and the optional data rotation element 307 (if present). The output of the optional data rotation element 307 (if present) is coupled to one of the inputs of the first buffer selector 308, the second buffer selector 312 and the third buffer selector 316. If the optional data rotation element is not present, the output of the lukewarm buffer 306 is coupled to one of the inputs of the first buffer selector 308, the second buffer selector 312 and the third buffer selector 316. The other input of the first buffer selector 308 is coupled to an output of buffer 2 314, the other input of the second buffer selector 312 is coupled to the output of buffer 3 318 and the other input of the third buffer selector 316 may, in some instances be coupled to the output of buffer 1 310. The output of the buffer 1 310 is also coupled to an input of a recovery selector 320, implemented as a 4:1 multiplexer. The output of the recovery selector 320 is coupled to an input of the operand selector 302. The operand selector 302, during a pipeline recovery, may be configured to select information received from the recovery selector 320 rather than from memory in order to backtrack as may be required.

In summary, and assuming an N buffer wide shift register portion, operand data that was fetched from the cache is temporarily stored into shift register section. On every cycle of data return to the execution unit, the existing data in those registers "shifts" left (Buffer N=>N−1, N−1=>N−2 . . . 2=>1, 1=>N), even as new fetch data is added to those registers/buffers. On a cache miss, care is taken to avoid overwriting previously fetched data that is required for the "missed"/rejected cycle of execution with newly fetched data. To ensure previously fetched data is not lost, N may be at least 1+Y buffers wide, where Y is the number of cycles between when the data is loaded from local cache and when indication that a local cache miss has occurred.

During a recycle window, the data is rotated through the buffers such that the prefetched data for the rejected execution cycle is available in the current register when the recycle window is completed.

To those skilled in the art, a local cache miss might not be the only case that data loaded is not valid for usage, there may be other reasons like a TLB miss, a set predict miss, or a load waiting on prior store cases.

Figure 4:
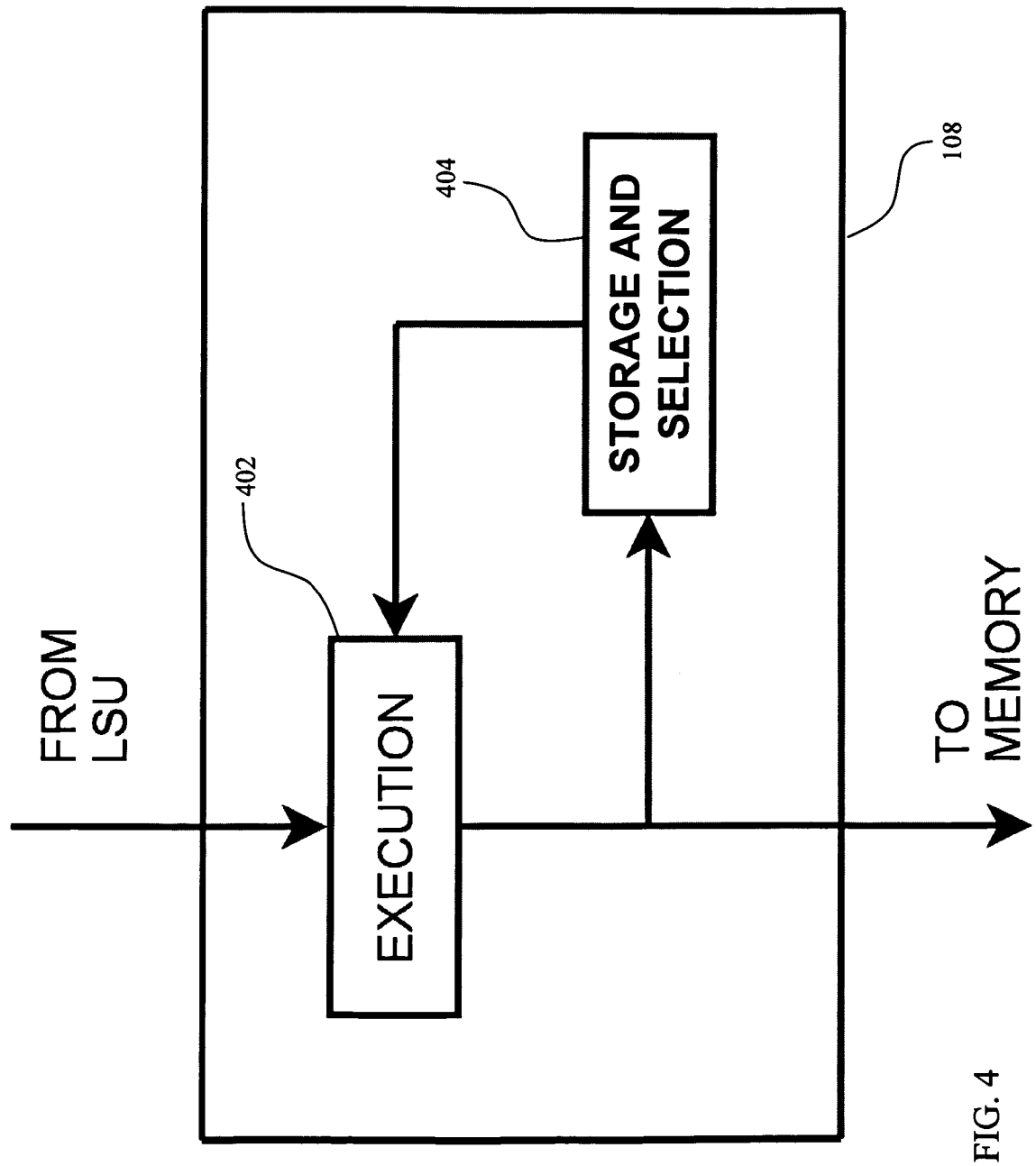
FIG. 4 shows a block diagram of an FXU according to an embodiment of the present invention.

FIG. 4 shows a block diagram of an FXU 108 according to an embodiment of the present invention. The FXU 108 includes an execution block 402 where operands are received and processes are performed thereon. The execution block 402 also receives information, for example, destination address information, from the storage and selection block 404. The receipt of such information by an execution block 402 of an FXU is well know in the art. According to the present invention, the storage and selection block 404 may also receive execution information, such as interim results, from the execution block 404. This may allow, in some embodiments, for the FXU 108 of the present invention to perform a pipeline recycle according to the present invention.

Figure 5:
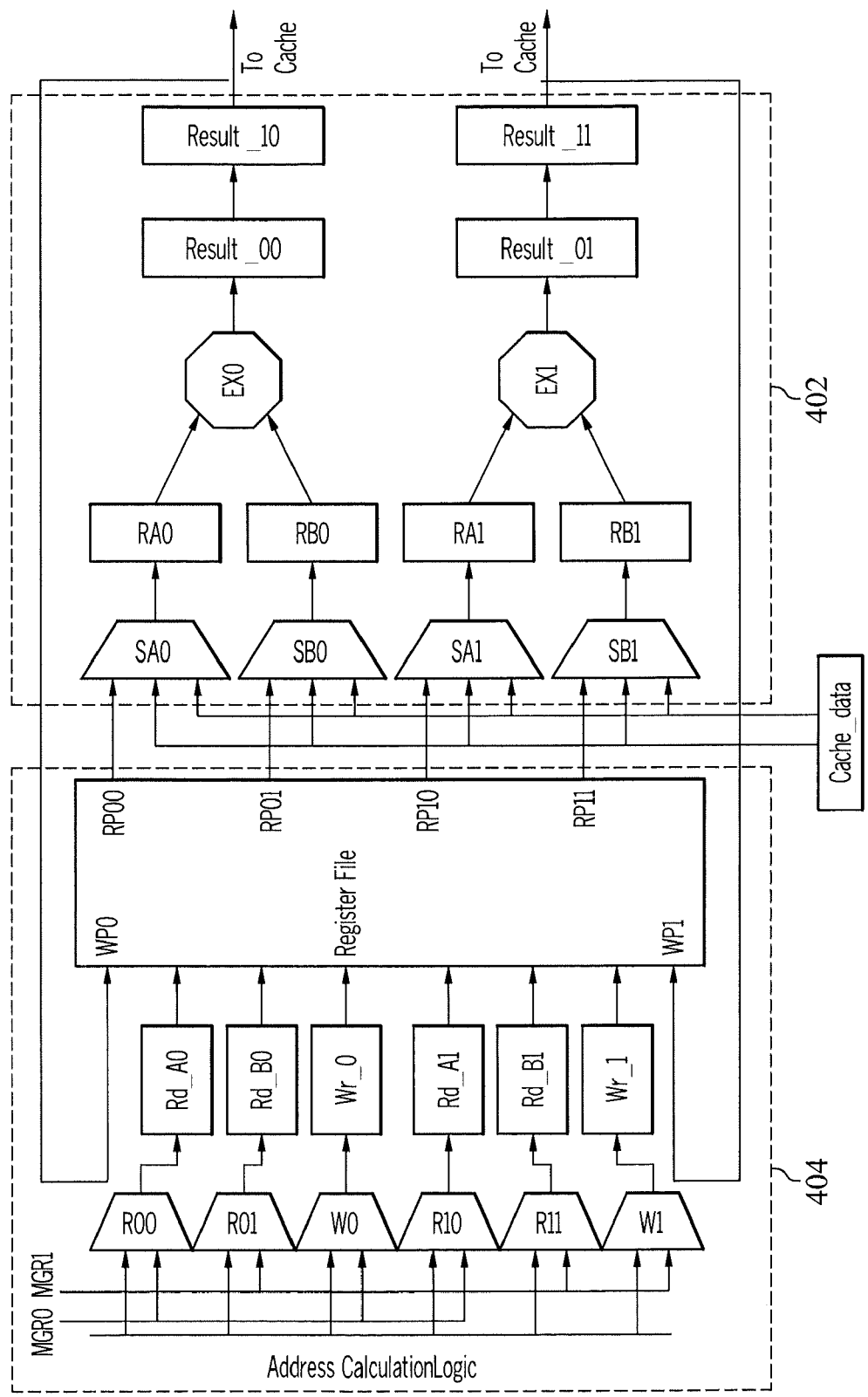
FIG. 5 shows a more detailed example of an FXU 108 according to the present invention.

FIG. 5 shows a more detailed example of an FXU 108 according to the present invention. As in FIG. 4, the FXU 108 shown in FIG. 5 includes an execution block 402 and a storage and selection block 404. Operands are received from an LSU at the inputs to the selection multiplexers SA0, SB0, SA1 and SB1. As shown, the operand data may be received on two input lines 502 and 504. In normal operation, the selector multiplexers select either operand data received from the input lines 502 and 504 or address values (such as destination addresses) from the register file 506.

As shown, the FXU's 108 operation is shown in a pipeline fashion divided into a plurality of cycles. The EX stage executes the actual calculation/operation on the date retrieved from the input lines in the previous EX-1 stage. Any error in the data being operated on the EX stage is not known until a following stage denoted P1.

The following description assumes that an N cycle instruction, which requires N execution steps, is being executed. As one of ordinary skill in the art will readily realize, each stage in the pipeline is executed N times during the instruction. In other words, if a nine cycle instruction is being executed, the EX stage must execute nine times in order to finish the instruction.

In the case where the instruction is reading cache data from the cache (via input lines 502 and 504), that data becomes available during each EX-1 stage. The appropriate data received from the input lines 502 is latched into the operand latches RA0, RA1, RB0, and RB1 by selector multiplexers SA0, SB0, SA1, and SB1, respectively, and is selected by a particular execution logic block EX0 or EX1 during the EX stage. If a cache miss occurs at a particular step in the execution of an instruction (for example, during execution step of N-4, where N is final step), the system is notified during the EX stage. That notification is received when execution data is located in the latches denoted as Result_00 and Result_01, during the P1 stage and Result_10 and Result_11 during the P2 stage. Because the calculation performed by the execution logic EX0 and EX1 during execution step N-4 is invalid, any write back enables (to cache or to the register file) are suppressed, to avoid corrupting the state of the machine, and a recycle window begins. Once the cache has recovered from the miss, the window closes, and cycle N-4 is re-executed. In some embodiments, this may be accomplished by storing coupling the latches Result_00, Result_01, Result_10, and Result_11 to the register file 506 so the values stored in Result_10 and Result_11 are also stored in Write Port 0 (hereafter WP0) and Write Port 1 (hereafter WP1) respectively. This allows for those values to be retained for at least one stage for use if a pipeline recycle is required.

In some cases, the result of the previous step (N-5) may be used to calculate the result of the subsequent step (N-4). Because the FXU is unable to re-execute step N-5, it is necessary to capture step N-5's result and re-read it once the recycle window has closed. To that end, the storage and selection unit 404 addresses for MGRs (shown as WP0 and WP1 of the register file 506) may be coupled to the multiplexers Wr0 and Wr1. When an error is detected, instead of choosing a write address from the normal address calculation logic 520, Wr0 and Wr1 choose MGR0 and MGR1 respectively. This value propagates to the register file 506, and results Result_10 and Result_11 are written to MGR0 and MGR1.

When the recycle window closes (restart), it is necessary to read that data back from MGR0 and MGR1. So, when restart is seen, multiplexer R00, R01, R10, and R11 switch. Instead of choosing a read address from the normal address calculation logic 520, R00, R01, R10, and R11 select either MGR0 or MGR1. Multiplexers SA0, SB0, SA1, and SB1 then choose either an N-5 result or new cache data (selects are instruction dependent), and the instruction is able to continue executing normally.

The capabilities of the present invention can be implemented in software, firmware, hardware or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A pipelined microprocessor configured for long operand instructions, the microprocessor comprising:
a memory unit;
a load-store unit coupled to the memory unit, the load-store unit including:
a data formatter, the data formatter for receiving information from the memory unit and including an operand selector and a shift register portion; and
an execution unit coupled to the load-store unit and receiving operand information there from, the execution unit including output latches coupled to a storage location within the execution unit for storing output information from the execution unit;
wherein the shift register portion includes a first section, a second section, and a recovery selector, the first section including a first input multiplexer and a first buffer and the second section including a second input multiplexer and a second buffer;
wherein an output of the second buffer is coupled to an input of the first input multiplexer and an output of the first buffer is coupled to an input to the recovery selector.

2. The pipelined microprocessor of claim 1, wherein the operand selector is a multiplexer.

3. The pipelined microprocessor of claim 1, wherein the execution unit includes an execution block and a storage and selection block.

4. The pipelined microprocessor of claim 3, wherein the output latches are contained in the execution block and are coupled to a memory location in the storage and selection block.

5. The pipelined microprocessor of claim 3, wherein the storage and selection block provides destination addresses to the execution block in a normal operating mode and provides the results of prior execution cycles during a pipeline recycle.

6. The pipelined microprocessor of claim 3, wherein the execution unit receives operands from the load-store unit.

7. A load-store unit for use in a pipelined microprocessor comprising:
  a data formatter, the data formatter configured to fetch operands from an external memory unit and to provide the operands to a functional execution unit; and
  a shift register portion configured to store a copy of the operands for at least one operational cycle after the operands have been fetched the external memory unit;
  wherein the shift register portion includes a first section, a second section and a recovery selector, the first section including a first input multiplexer and a first buffer and the second section including a second input multiplexer and a second buffer;
  wherein an output of the second buffer is coupled to an input of the first input multiplexer and an output of the first buffer is coupled to an input to recovery selector.

8. The load-store unit of claim 7, wherein the data formatter includes an operand selector configured to select an order for providing the operands to the functional execution unit.

9. A method of recovery from a cache miss comprising:
  receiving operand data from a plurality of cache accesses;
  storing the operand data from a first cache access in a third buffer;
  a first shifting including shifting the operand data from the first cache access to a second buffer and storing the operand data from a second cache access into the third buffer;
  a second shifting including shifting the operand data from the first cache access to a first buffer, shifting the operand data from the second cache access to the second buffer and storing the operand data from a third cache access into the third buffer;
  determining that a cache miss has occurred; and
  providing the operand data stored in one of the first buffer, the second buffer or the third buffer to an output.

10. The method of claim 9, wherein the receiving, storing, first shifting, second shifting and providing are performed in a load-store unit.

11. The method of claim 9, wherein providing includes providing the operand data to a functional execution unit.

* * * * *